A. J. KETELSEN.
FAUCET.
APPLICATION FILED JUNE 22, 1910.
998,531.
Patented July 18, 1911.
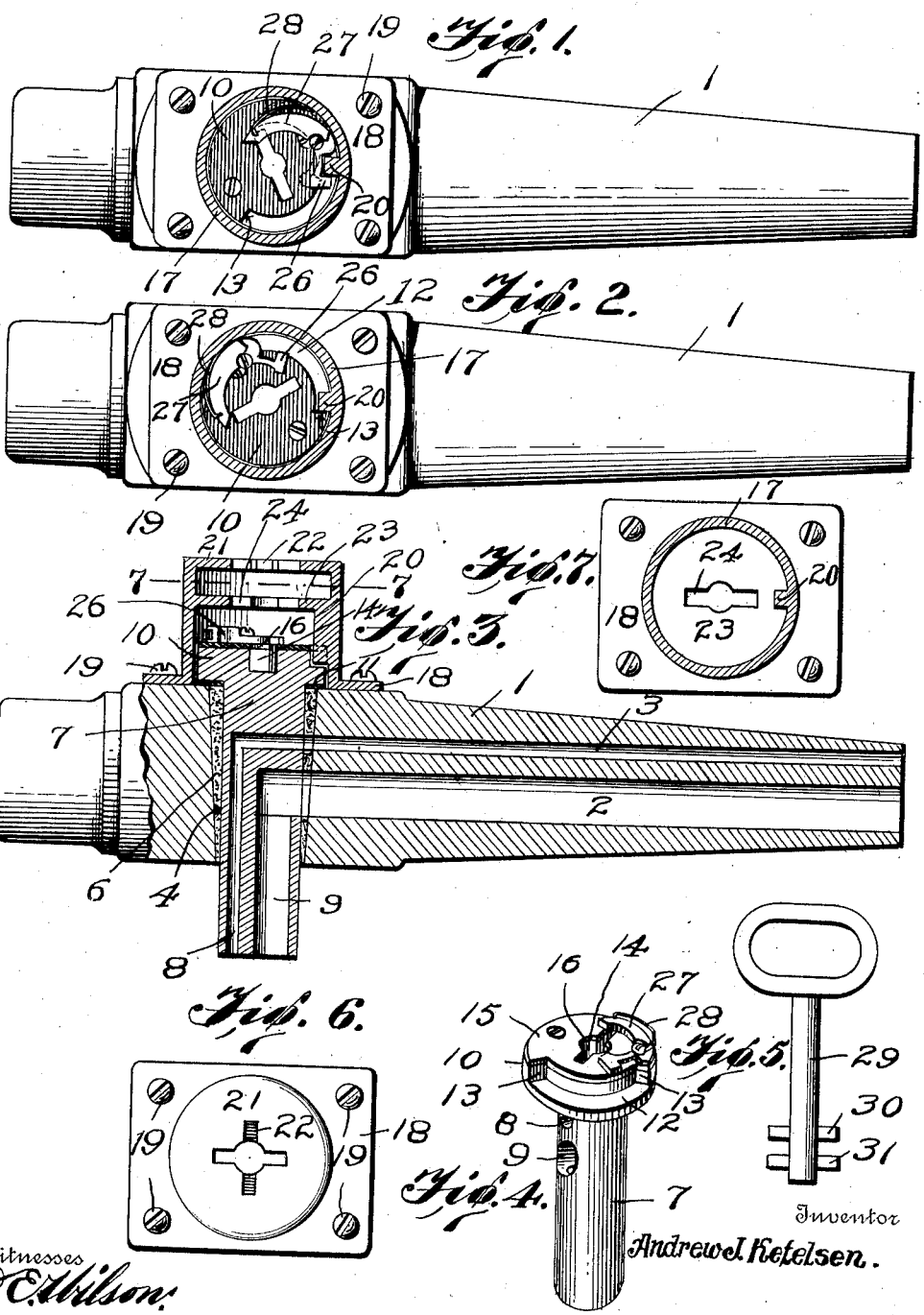

UNITED STATES PATENT OFFICE.

ANDREW J. KETELSEN, OF CHICAGO, ILLINOIS.

FAUCET.

998,531. Specification of Letters Patent. Patented July 18, 1911.

Application filed June 22, 1910. Serial No. 568,322.

*To all whom it may concern:*

Be it known that I, ANDREW J. KETELSEN, a citizen of the United States of America, residing at Chicago, in the county of Cook and State of Illinois, have invented certain new and useful Improvements in Faucets, of which the following is a specification, reference being had therein to the accompanying drawing.

This invention relates to faucets, and the principal object of the same is to provide novel means for locking the turning plug thereof so that unauthorized use of the faucet is prevented.

With the above and other objects in view, the invention contemplates a faucet in which the plug is normally locked against movement and can only be operated by the use of a key.

The invention also contemplates a novel lock casing in which means are provided that prevent the key being removed therefrom, except when the mechanism has been operated to lock the plug in a faucet-sealing position, which construction obviously prevents the faucet being inadvertently left in a condition that will permit liquid, air, or the like to pass therethrough.

In carrying out the objects of the invention generally stated above, it will be understood, of course, that the essential features thereof are necessarily susceptible of changes in details and structural arrangements, one preferred and practical embodiment of which is shown in the accompanying drawings, wherein;

Figure 1 is a top plan view of the improved faucet, the upper portion of the lock casing being broken away to show the plug locked to said casing. Fig. 2 is a similar view showing the plug released. Fig. 3 is a vertical longitudinal sectional view of the improved faucet. Fig. 4 is a detail perspective view of the turning plug and locking means carried thereby. Fig. 5 is a detail view of the key for operating the lock and plug. Fig. 6 is a top plan view of the lock casing. Fig. 7 is a transverse sectional view taken on the line 7—7 of Fig. 3.

Referring to said accompanying drawings by numerals, 1 designates the body of the improved faucet which is provided with the usual longitudinal discharge opening 2 and parallel vent opening 3, said openings communicating with the transverse vertical bearing opening 4 provided with cork or other bushing 6. The turning plug 7 is rotatably mounted in said bushing 6 and is provided with a vent opening 8 and a discharge opening 9, said openings forming a continuation of the openings 2 and 3 of the body 1 of the faucet when the plug 7 is in an "open" position, in a manner well understood. The said plug 7 has a flanged head 10 that rests on a suitable bearing plate or gasket 11 that surrounds the upper end of bearing opening 4. Said head 10 is provided with a cut-away portion 12, the ends 13 of which provide abutments that limit the rotary movements of the plug. A slot or recess 14 is formed in the center of head 10, and said head carries a plate 15 that conforms to the contour of the upper surface thereof. The plate 15 is provided with a central key-hole 16 that communicates with slot or recess 14, said key-hole being smaller than said slot or recess.

A lock casing 17 has a base flange 18 that is detachably fastened to the upper surface of the faucet body 1 by means of the screws or other suitable fasteners 19. Said casing is provided with an internal lug 20 with which the abutments 13 of the plug 7 contact to limit the rotary movements of said plug. The cover plate 21 of the casing is provided with two key-hole slots 22 arranged in crossing relation, and within the casing and spaced from said plate 21, an intermediate plate 23 is arranged that is provided with a central key-hole 24 that is in alinement with one of the key-holes 22 and alines with the key-hole 16 of plug plate 15 when the plug is locked. The plug plate 15 has a locking pawl 26 pivotally mounted thereon adjacent one of the abutments 13. An arm 27 is carried by said pawl 26, said arm 27 being normally held across one end of key-hole 17 of plate 15 by the pressure of a spring 28, so that the pawl 26 engages the lug 20 to lock the plug 7 to the casing 17.

The key 29 used in connection with this invention is provided with two sets of bits 30 and 31. The bits 30 are for the purpose of holding the pawl 26 away from lug 20 and the bits 31 are for the purpose of entering the recess of the lug 7 through plate 15 so that by rotating the key bits 31 will rotate the plug.

As will be noted, the slots of the cover plate 21 of casing 17 are arranged to facilitate the entrance of the key 29, and the slot of intermediate plate 23 is in alinement with the slot of plug plate 15 when the plug is locked to said casing. It will, therefore, be seen that with the plug locked to the casing, as shown in Fig. 1, the lower bits 31 of the key 29 rock the arm away from the key-hole and release the pawl 26. This permits the bits 31 to enter the recess of the plug 7 and the bits 30 to remain in the plate 15 in position to prevent the pawl engaging the casing 17. When the parts are in this position, a rotation of the key will similarly actuate the plug so that the passages or openings through the plug and body 1 are in communication, but the key cannot be removed until the plug is rotated to bring the key-hole of plate 15 into alinement with the key-hole of plate 23. When in this position, the removal of the key permits the pawl 26 to engage the lug 20 on one side and the adjacent abutment 12 engages the opposite side of said abutment, thereby locking the pawl.

What I claim as my invention is:

1. A faucet comprising a body, a turning plug therefor, a locking pawl carried by said plug, a casing carried by the body and inclosing said pawl, a lug carried by said casing and with which said pawl engages, a key provided with means for releasing said pawl and rotating said plug, and means carried by said casing for preventing removal of said key when the pawl is released from said lug.

2. A faucet comprising a body, a plug therefor, provided with a flanged head, said head provided with abutments, a casing carried by said body and surrounding said head, a lug carried by said casing and in the path of movement of said abutments, lug-engaging means carried by said head, and means for releasing said lug engaging means and rotating said plug.

3. A faucet comprising a body, a turning plug carried thereby, said plug provided with a central slot in the top, abutments carried by the top of said plug, locking means also carried by the top of said plug, a casing carried by said body and surrounding the top of said plug, an internal lug carried by said casing and in the path of movement of said abutments, a top plate carried by said casing and provided with key-holes arranged in crossing relation, an intermediate plate also carried by said casing and provided with a key-hole that alines with one of the slots of the top plate, and the slot in the top of the plug when said plug is locked, and a key provided with means for holding the locking means released and for rotatably engaging the plug slot to rotate the plug.

4. A faucet comprising a body, a turning plug therefor, said plug provided with key-engaging means, a casing carried by the body and provided with a cover, said cover provided with key-holes, an intermediate plate provided with a key-hole that is in alinement with one of the key-holes of the cover and with the key-engaging means of said plug when the plug is closed, locking means carried by the plug, and a key provided with bits for holding the locking means released and for engaging with the said key-engaging means to rotate the plug.

5. A faucet comprising a body, a turning plug therefor, provided with abutments, a casing carried by said body and provided with a lug that is in the path of movement of said abutments, a pawl pivotally connected to said plug, a spring for holding said pawl in position to engage said lug, and means for releasing said pawl and rotating said plug.

In testimony whereof I hereunto affix my signature in presence of two witnesses.

ANDREW J. KETELSEN.

Witnesses:
PHILIP BESELER,
ROBERT P. HILLINGER.